United States Patent [19]
Wasserman et al.

[11] Patent Number: 5,341,480
[45] Date of Patent: Aug. 23, 1994

[54] METHOD AND APPARATUS FOR PROVIDING A TWO CONDUCTOR SERIAL BUS

[75] Inventors: Steven Wasserman, Sunnyvale; Steven Roskowski, San Jose, both of Calif.

[73] Assignee: Apple Computer, Inc., Cupertino, Calif.

[21] Appl. No.: 866,816

[22] Filed: Apr. 9, 1992

[51] Int. Cl.$^5$ ............ G06F 13/00; G06F 13/36; G06F 13/368; G06F 13/376
[52] U.S. Cl. ............ 395/325; 364/240; 364/240.4; 364/242.6; 364/242.92
[58] Field of Search ............ 395/200, 275, 325, 725; 364/240, 240.2, 242.92, 927.93, 940.2, 935.41, 940.71, 265.1, 260.1, 945.6; 375/117, 36

[56] References Cited
U.S. PATENT DOCUMENTS

| | | |
|---|---|---|
| 4,195,351 | 3/1980 | Barner et al. |
| 4,689,740 | 8/1987 | Moelands et al. |
| 4,847,867 | 7/1989 | Nasu et al. ............ 375/36 |
| 4,899,143 | 2/1990 | Gopinath et al. ............ 340/825.5 |
| 5,063,561 | 11/1991 | Kimmo ............ 370/85.2 |
| 5,119,292 | 6/1992 | Baker et al. ............ 395/725 |
| 5,175,750 | 12/1992 | Donovan et al. ............ 375/117 |
| 5,195,185 | 3/1993 | Marenin ............ 395/325 |

*Primary Examiner*—Dale M. Shaw
*Assistant Examiner*—D. Dinh
*Attorney, Agent, or Firm*—Blakely, Sokoloff, Taylor & Zafman

[57] ABSTRACT

A method for rapidly transferring serial data in a two conductor busing arrangement in which one conductor is utilized to transfer data and the other conductor is utilized to transfer clock signals, and in which a plurality of components are connected to the two conductors, at least one of which is capable of acting as a bus master including the steps of providing clock signals on the clock conductor which are active on both edges, placing a special signal on the data conductor to indicate the start of an operation, placing address data on the data conductor to indicate an address on the data conductor, placing data on the data conductor to indicate the type of transfer to be made, acknowledging the receipt of the address by a component being addressed, transferring data on the data conductor, placing a special signal on the data conductor to indicate the end of the data transfer, transferring a signal indicating a parity count, and placing another special signal on the data conductor to indicate the end of the operation.

7 Claims, 5 Drawing Sheets

METHOD AND APPARATUS FOR PROVIDING A TWO CONDUCTOR SERIAL BUS

BACKGROUND OF THE INVENTION

1. Field Of The Invention

This invention relates to computer systems and, more particularly, to methods and apparatus for providing a two conductor serial bus for communicating with the internal registers of computer circuitry arranged on a data bus in order to configure programmable chips of the computer circuitry.

2. History Of The Prior Art

As the physical size of circuit elements used in computer circuits grows smaller and the number of individual circuit elements in an integrated circuit grows larger, providing a sufficient number of terminals to connect the devices of the integrated circuit to external circuitry becomes a major problem. No matter how many terminals are provided, the number always seems insufficient to handle the signals needed. Along with the reduction in size of the area available for terminals due to the reduction in size of the integrated circuits has come an increase in the word size of the data handled by computers. Typically newer computers are being designed to handle thirty-two and even sixty-four bit word lengths. In order to provide paths for thirty-two bits of data, the number of conductors used by a typical bus approximates fifty. Consequently, it is very difficult to find room for terminals to transfer signals in addition to those transferred over a primary bus.

For this reason, it is often necessary to furnish signals to integrated circuits other than by the primary system bus. For example, if an integrated circuit of a computer system includes configurable registers, signals used for accessing those registers must be transferred to the integrated circuits in some manner. These signals often have very limited access to terminals on the integrated circuits, as has been pointed out, simply because of the reduction in the physical size of the circuits and the need for so many terminals to carry signals related to the primary system bus. This is especially true in a system in which the primary bus is expected to carry video information for display or other real time signals. Due to the width of the primary bus necessary to handle video signals, it is expensive and thus undesirable to multiplex different types of signals onto the primary bus and also to route the primary bus to several locations.

Consequently, it is very desirable to provide some alternative arrangement which uses a minimal number of terminals in order to transfer signals such as those signals used to access internal registers on an integrated circuit chip. Moreover, it is important that such a bus be able to accomplish signal transfer rapidly, accurately, and efficiently.

SUMMARY OF THE INVENTION

It is, therefore, an object of the present invention to provide a new bus for transferring signals to a minimal number of terminals on an integrated circuit chip.

It is another more specific object of the present invention to provide a fast two conductor serial bus for transferring signals such as control signals in a computer system to integrated circuits and similar circuits when only a minimum number of terminals are available.

These and other objects of the present invention are realized in a method for rapidly transferring serial data in a two conductor busing arrangement in which one conductor is utilized to transfer data and the other conductor is utilized to transfer clock signals, and in which a plurality of components are connected to the two conductors, at least one of which components is capable of acting as a bus master comprising the steps of providing clock signals on the clock conductor which are active on both edges, placing a special signal on the data conductor to indicate the start of an operation, placing address data on the data conductor to indicate an address on the data conductor, placing data on the data conductor to indicate the type of transfer to be made, acknowledging the receipt of the address by a component being addressed, transferring data on the data conductor, placing a special signal on the data conductor to indicate the end of the data transfer, transferring a signal indicating a parity count, and placing another special signal on the data conductor to indicate the end of the operation.

These and other objects and features of the invention will be better understood by reference to the detailed description which follows taken together with the drawings in which like elements are referred to by like designations throughout the several views.

NOTATION AND NOMENCLATURE

Some portions of the detailed description which follows are presented in terms of symbolic representations of operations on data bits within a computer memory. These are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind.

The present invention relates to a method and apparatus for operating a computer in processing electrical or other (e.g. mechanical, chemical) physical signals to generate other desired physical signals.

DETAILED DESCRIPTION OF THE INVENTION

Figure 1:
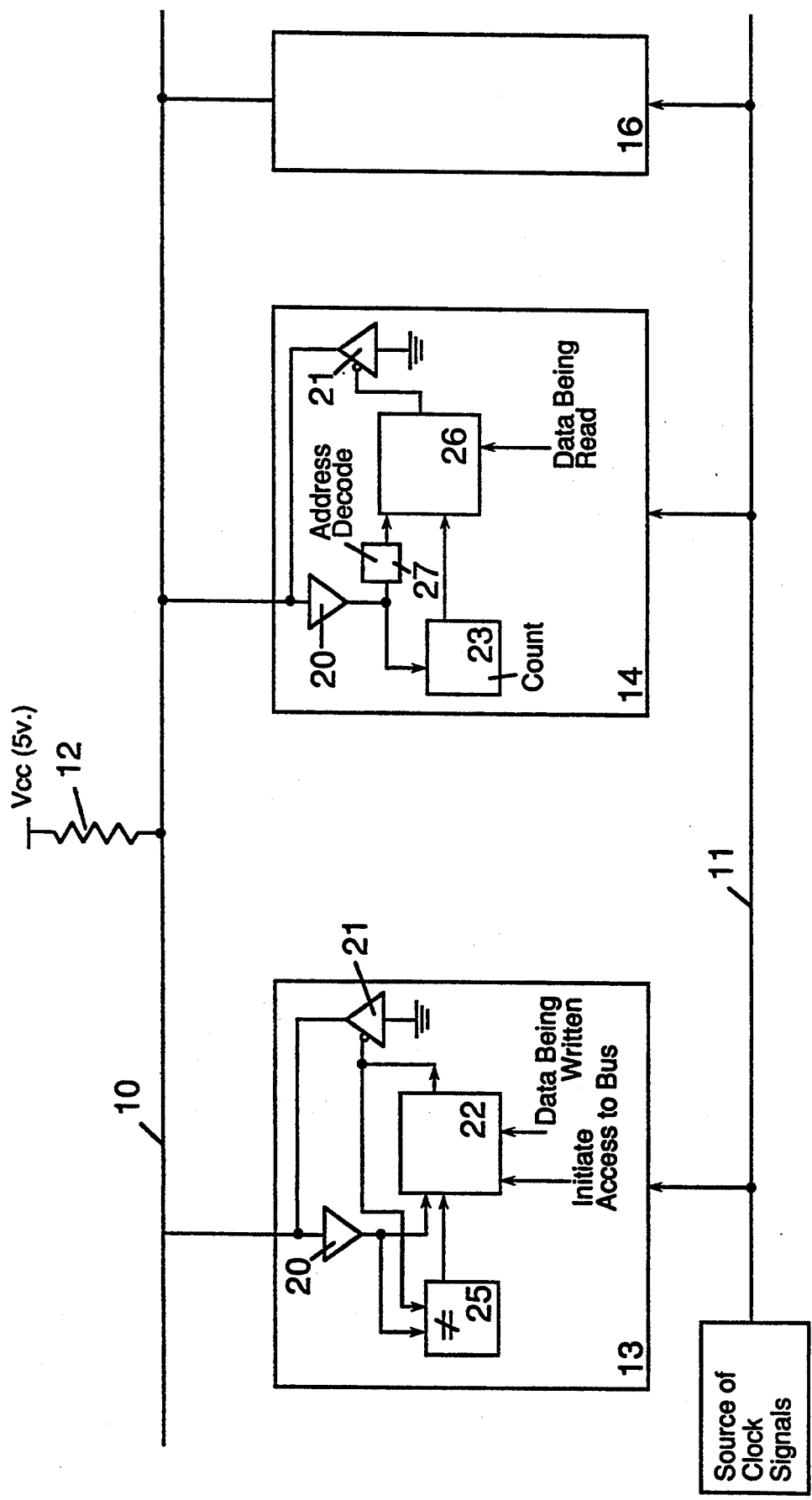
FIG. 1 is a circuit diagram illustrating the connection of a number of circuits connected to a bus designed in accordance with the present invention.

Referring now to FIG. 1, there is illustrated a partially-block partially-circuit diagram of an arrangement in accordance with the present invention. In FIG. 1 is shown a two conductor bus which includes a first conductor 10 upon which data may be transferred serially. The conductor 10 (hereinafter also referred to as the data bus 10) is joined to a source of voltage Vcc by a resistor 12. A second conductor 11 of the two conductor bus circuit is used for providing clock signals to circuits connected to the data bus 10. Connected to the data bus 10 are a bus master circuit 13, a first bus slave circuit 14, and a second bus slave circuit 16. A bus master circuit is capable of initiating or responding to operations on the bus while a bus slave circuit is only capable of responding to operations initiated by a bus master circuit. Of course, the bus slave circuits 14 and 16 might be replaced by bus master circuits without varying the operation of the invention. Each of the circuits 13, 14, and 16 is also connected to a source of clock signals by the clock conductor 11 of the bus. The circuitry shown in FIG. 1 for each of the circuits 13, 14, and 16 is that used for accomplishing the transfer of data including access to and release of the bus; not shown is circuitry which furnishes the data which is transferred on the bus 10 or circuitry which uses that data.

Each of the circuits 13, 14, and 16 has a sensing buffer 20 connected to the conductor 10. The sensing buffer 20 provides a high impedance path which is used to detect the condition of the data bus 10 during its operation. When none of the circuits 13, 14, or 16 is connected to the data bus 10 through a tristate buffer 21, only a very small amount of current flows through the resistor 12 and the paths provided by the buffers 20. Consequently, there is a very small voltage drop across the resistor 12; and the buffers 20 each detect a high condition on the data bus 10 approximately equal to the value of Vcc (typically five volts).

Each of the circuits 13, 14, and 16 also includes the tristate buffer 21 mentioned above. Each buffer 21 is connected between ground and the data bus 10 so that when it is activated by a signal applied to an enable terminal, a low impedance path to ground is provided. This causes a large amount of current to flow through the resistor 12 causing the voltage level on the data bus 10 to fall to and reside at a voltage close to ground. In this condition, all of the buffers 20 sense a low voltage value on the data bus 10. With this type of arrangement (often referred to as a "wired AND circuit"), whenever any of the circuits 13, 14, or 16 is connected to the data bus 10 through an enabled tristate buffer 21, the data bus 10 is placed in the low voltage condition. On the other hand, if no tristate buffer 21 is enabled so that none of the circuits 13, 14, or 16 is connected to the data bus 10 through a buffer 21, the data bus 10 resides at the high voltage level. In this manner, a circuit attempting to gain access to the bus will detect a low voltage level on the data bus 10 if another circuit has already gained access and may terminate its attempt to gain access until the voltage level on the bus 10 goes high.

In order to control the operation of the two conductor serial bus described above, the bus master circuit 13 includes a state machine 22 and various associated circuitry for producing the signals necessary to the operation of a bus master circuit. Although only shown in the bus slave circuit 14 of FIG. 1, both the bus slave circuits 14 and 16 and any bus master circuit (including bus master circuit 13) include a bus slave state machine 26 and various associated circuitry used for the operation of a bus slave circuit connected to the two conductor bus.

Figure 2:
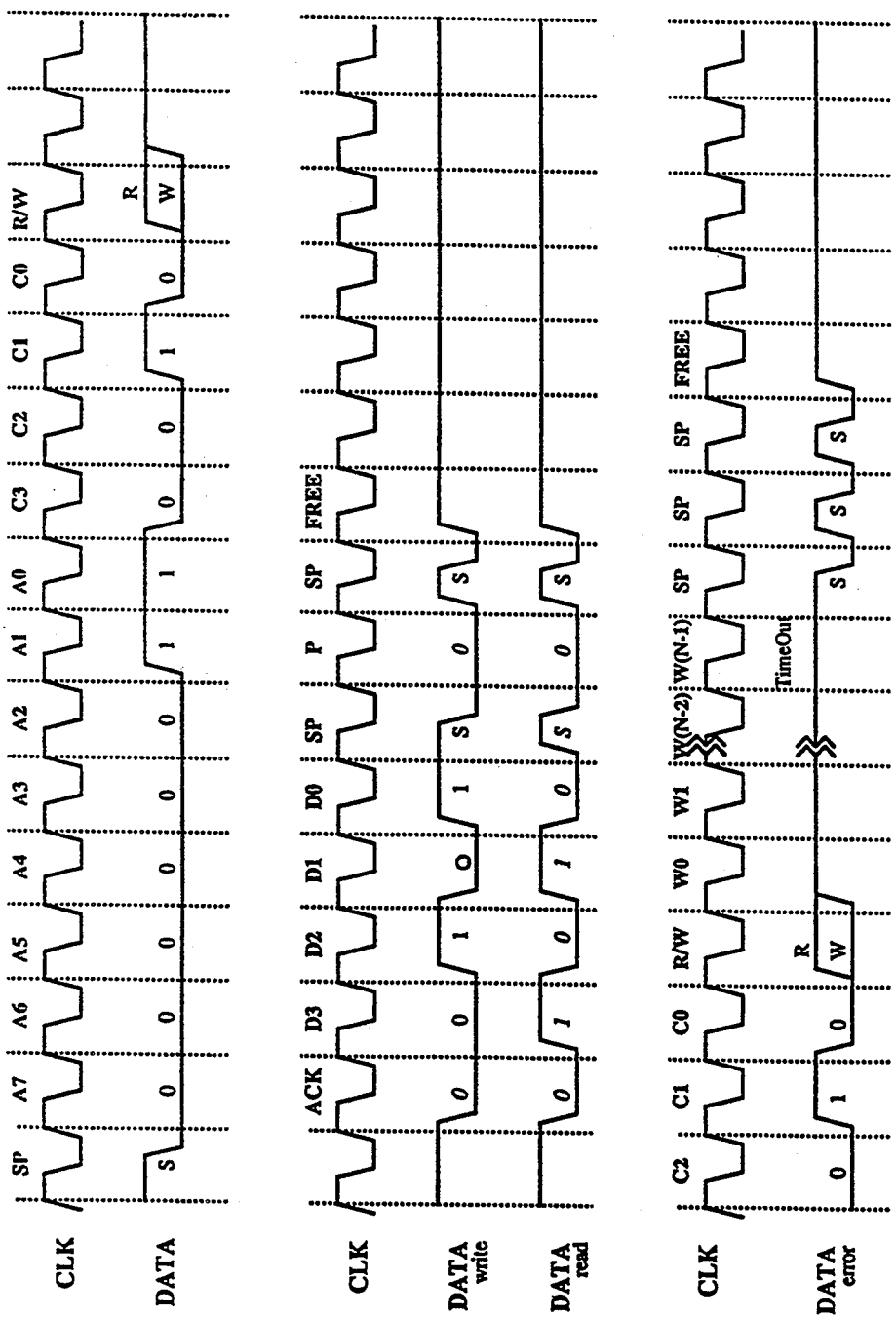
FIG. 2 is a timing diagram illustrating the operation of the circuitry of the present invention.

FIG. 2 is a timing diagram illustrating the signals utilized for operating the bus of this invention to control the fast transfer of signals using the two conductors 10 and 11 available. It should be noted that the timing diagram of FIG. 2 includes three portions. The first portion includes the upper two lines of signals. These signals occur first in time and proceed in time from left to right. The next portion includes the middle three lines; this portion follows the upper two lines in the time sequence. The bottom two lines may occur beginning during the clock period C2 of the first portion and replace the middle three lines in the case of a data error.

Figure 3:
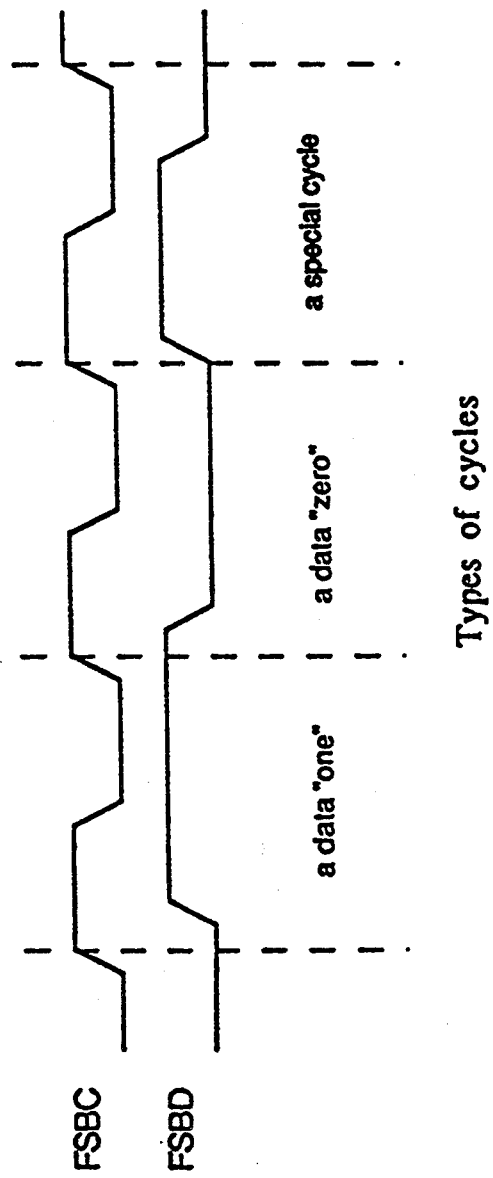
FIG. 3 is a diagram illustrating three types of data signals used in the present invention.

The clock signal CLK illustrated at the top of the figure (and in the third and sixth lines) appears on the bus conductor 11. The signal CLK is unique to the serial bus disclosed herein and is not necessarily associated with other clocks of the computer system in which the invention is utilized. The clock CLK is active on both edges. This allows four individual types of signals to be transferred on the data bus 10, only three of which are utilized in the present invention. These signals are illustrated in FIG. 3. The data signals available are a high value on both the falling and rising edges of the clock (interpreted as a one), a low value on both the falling and rising edges of the clock (interpreted as a zero), a high value on the falling edge and a low value on the rising edge of the clock (interpreted as a SPECIAL signal), and a low value on the falling edge and a high value on the rising edge of the clock (unused).

Below the clock signal CLK in FIG. 2 are illustrated the data signals transferred during a write cycle, the signals transferred during a read cycle, and the data signals transferred in case of an error on the data bus 10. The data transferred during the first portion of either the read or write operation is essentially the same; this is illustrated in line two of the timing diagram. In order to initiate an operation, a SPECIAL signal is placed on the data bus 10 during the first clock period illustrated in FIG. 2 by the bus master circuit 13 or any similar bus master circuit. The transfer of the special signal and similar arbitration signals occurs under control of the bus master state machine 22 shown in FIG. 1. Following the SPECIAL signal, eight clock periods A7-A0 are provided in which a register address is placed, most significant bit (MSB) first, on the data bus 10 by the state machine 22 of the bus master circuit 13. The eight bits provided for the register address allow a total of 256 registers on any integrated circuit chip to be addressed. In the particular operation illustrated in FIG. 2, the first six clock periods are used to transfer zeroes and the last two to transfer ones so that the register addressed is register three. Following the register address, four clock cycles are provided for the transfer of a chip address, most significant bit first. The four cycles allow a total of sixteen individual chips to be connected to the bus; and, in the case illustrated, the chip numbered two is chosen by the data signal.

The arrangement of the present invention provides a very convenient method of arbitrating access to the bus by any bus master circuits connected thereto. Since each bus master circuit includes a buffer for sensing the condition of the data conductor at all times, if two bus master circuits are attempting to access the bus simultaneously, the bus master attempting to transfer data to the lowest valued address will provide a low condition on the data conductor during some clock period in which the other bus master circuit provides a high value (since a lower numbered address will continue to display a zero during a clock period when the higher numbered address has changed to a one where addresses appear most significant bit first). Since the data conductor 10 cannot go high when a low condition is provided (ground is connected), the bus master circuit addressing the higher numbered address will detect an incorrect value and terminate its attempt to access the bus. To accomplish this, a comparator 25 in each of the bus master circuits may provide a signal to the state machine 22 indicating that the signal which the bus master attempted to place on the data conductor and the condition of the data conductor differ. In such a case, the state machine 22 of the bus master which fails to gain access to the bus stores an indication of this failure in the state machine 22 and waits for a signals indicating that the bus has been released. This is a simple and very fast method of arbitration. It also allows an especially important register of a chip to be given a higher arbitration priority than other registers by the simple expedient of assigning the register a lower numbered register address.

Following the transfer of the address for the data by the bus master circuit 13, the state machine 22 of the bus master circuit asserts either a one or a zero on the data conductor 10 depending on whether the operation to be accomplished is a read or a write. A one value indicates a read operation; a zero value indicates a write operation. Following the selection of the particular operation, the bus master circuit releases the data bus 10. The data bus 10 assumes a high value and awaits an acknowledge signal from the circuit addressed. An acknowledge signal is indicated by the circuit addressed asserting a low value (a zero) on the data bus 10 after a wait sufficient to decode and test the address. A bus slave state machine 26 of the bus slave or master circuit addressed generates an acknowledge signal after notification by an address decoder circuit 27 that the particular circuit is the one addressed. After the assertion of the acknowledge signal by the bus slave circuit, a bus master circuit performing a write operation transfers data on the data bus 10 during a number of clock periods which may vary depending on the computer system and the particular operation involved. In the system operation shown, data for configuring a register is transferred most significant bit first during four clock periods. The end of the data transfer is signalled by the assertion of a SPECIAL signal on the data bus 10 by the bus master circuit 13.

At this point, the state machine 26 of the bus slave circuit being addressed senses the count provided by a counting circuit 23 and provides a signal on the bus 10 indicating the parity of the signals transferred on the data line. If the parity is correct, the bus master circuit 13 places another SPECIAL signal on the data line 10 indicating the completion of the particular operation and releasing the bus.

The parity signal is one which is produced by the circuit addressed (the bus slave circuit in this case) counting the total number of ones provided on the data line during the transmission of the addresses, the operation definition, and the data. In the particular arrangement of the preferred embodiment, the counting circuit 23 is initially in a one state and inverts the state as each new one appears so that an odd count produces a parity of zero and an even count produces a parity of one. In the write operation illustrated, the parity signal is therefore a zero. The use of a parity signal provides an extra check on the authenticity of the information provided which is not typical of desktop computer systems. In the preferred embodiment of the invention, if the parity signals do not match, the operation is retried once and then abandoned.

In a manner similar to the transfer of write signals from the bus master circuit 13 to the bus slave circuit, following the acknowledge signal asserted by the bus slave circuit in a read operation, the bus slave circuit transfers data from a source of data for the appropriate number of clock periods and then asserts a SPECIAL signal to indicate the transfer of data is complete. The bus slave circuit then transfers the result of the parity count on the data line 10. If the parity signal matches the count at the bus master circuit, the bus master circuit places a second SPECIAL signal on the data line 10 to indicate the completion of the read operation.

There can arise a case in which the slave does not acknowledge the master circuit. For instance, if a bad address has been set up in the master circuit by the software this may occur. This condition is not necessarily a fatal error; and the master should be able to terminate the cycle prematurely and allow other transfers to continue. This is achieved by the master circuit driving three SPECIAL cycles on the bus after a certain time-out period as is illustrated in the third portion of FIG. 2. In FIG. 2, a timeout is generated when no acknowledge signal has been received after "N" clock cycles, where N can be any reasonable integer somewhat greater than the longest bus transaction.

Figure 4:
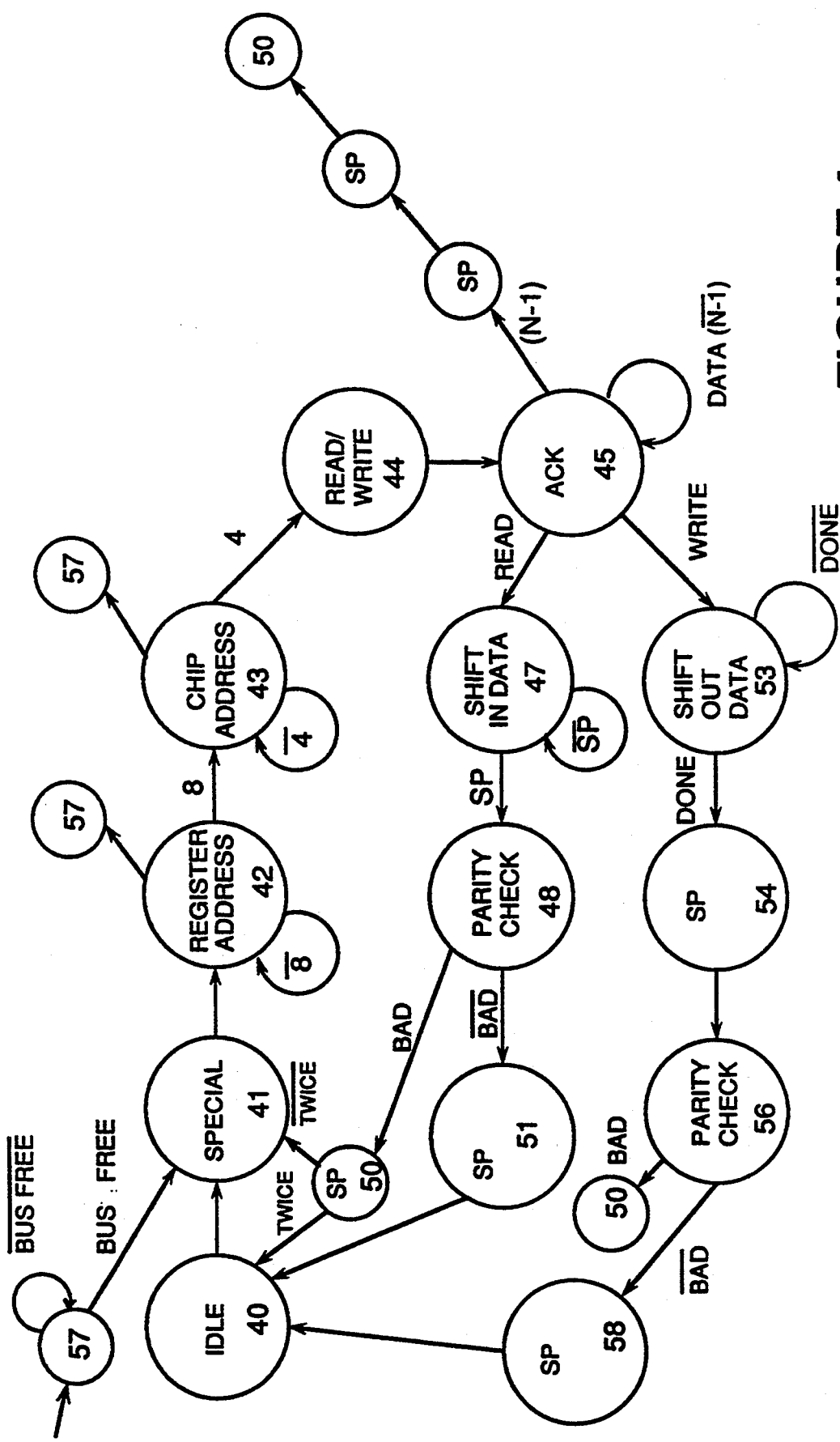
FIG. 4 is a state transition diagram for a state machine used in a bus master circuit used in the present invention.

FIG. 4 is a state transition diagram describing a bus master state machine 22 which may be included in bus master circuit such as the circuit 13. In FIG. 4, the operation of the state machine 22 of the bus master circuit 13 starts at an IDLE condition 40. The bus master circuit initiates an operation in response to some external signal (e.g., a user instruction or a software instruction) defining the operation and its address by asserting a SPECIAL signal at a state 41. The SPECIAL signal is followed at state 42 by eight clock periods during which a register address is asserted. When the eight cycles are completed, the state machine 22 transitions to state 43 to transfer a chip address for four clock periods. At the end of the four cycles of chip address, the state machine 22 transitions to a state 44 to assert a read or a write signal. The bus master state machine 22 then pauses and awaits the acknowledge signal from the bus slave circuit at a state 45.

If after N clock cycles, the master circuit does not receive an acknowledge, the master state machine 22 terminates the transaction by driving three SPECIAL signals onto the data bus 10. On the first failure, the master circuit goes through states 50 and 41 to try again. On the second failure, the master circuit returns to the state 40 from state 50 and enters the IDLE condition. Here the master may notify the system software, for example, of the failure.

Upon receipt of the acknowledge signal at state 45, the state machine 22 transitions to the first state in the particular read or write operation. In the case of a read operation, the state machine 22 transitions to a state 47 to shift in data until the receipt of a SPECIAL signal. Upon receipt of a SPECIAL signal, the state machine 22 transitions to a parity check operation at state 48. On a first failure of a parity check, the state machine asserts a SPECIAL signal at state 50 and moves to retry the read operation at state 41. If a second later parity check is a failure, the state machine 22 transitions from state 50 back to the IDLE state 40. If the parity check does not fail, the state machine 22 transitions to a state 51 to assert a SPECIAL signal ending the operation and allowing other bus master circuits to attempt to gain access to the data bus 10.

In the case of a write operation initiated after receiving an acknowledge signal at state 45, the bus master state machine 22 moves to a state 53 to write the data which is to be transferred to the bus slave circuit. When the data has been transferred, the state machine 22 transitions to a state 54 at which a SPECIAL signal is generated and from there to a parity check state 56. A failure of the parity check takes the operation to the state 50 and proceeds in the same manner as a read operation. If the parity check is successful, another SPECIAL signal is asserted at state 58 to indicate that the operation is complete and other bus master circuits may attempt access to the bus 10; and the state machine 22 moves to the IDLE state 40.

A state 57 in the diagram of FIG. 4 indicates the condition of a bus master circuit which attempts access to the bus 10 and loses an arbitration. As outlined above, since each bus master circuit includes a buffer for sensing the condition of the data conductor at all times, if two bus master circuits are attempting to access the bus, the bus master attempting to transfer data to the lowest valued address will provide a low condition on the data conductor during some clock period in states 42 or 43 in which the other bus master circuit provides a high value. Since the data conductor 10 cannot go high when ground is connected, the bus master circuit with the higher numbered address will detect an incorrect value (for example, by means of a comparator comparing signals placed and received on the bus 10 at each of the circuits 13, 14, and 16), move to the state 57, and terminate its attempt to access the bus. The bus master circuit will remain in the state 57 awaiting another period at which it may access the bus. While in state 57, the bus master circuit may detect the end of the access by another bus master circuit (so that it may return to the state 41 and attempt to gain access to the bus) by listening for the signal sequence SPECIAL/parity/SPECIAL provided during the states 54, 56, and 58 of the bus master circuit which has acquired the bus.

This is especially useful where a number of master circuits are to access the bus 10 in sequence. The system software may cause sequential accesses to occur by causing the master circuits to access the data bus 10 simultaneously. The two circuits will both attempt the access, and the one using the lowest address will gain access. When it completes its access, the second bus master (and third and fourth) will acquire access to the bus and complete its transfer of data. By making the addresses of the cards programmable by software, the particular sequence desired may be set at any time.

Figure 5:
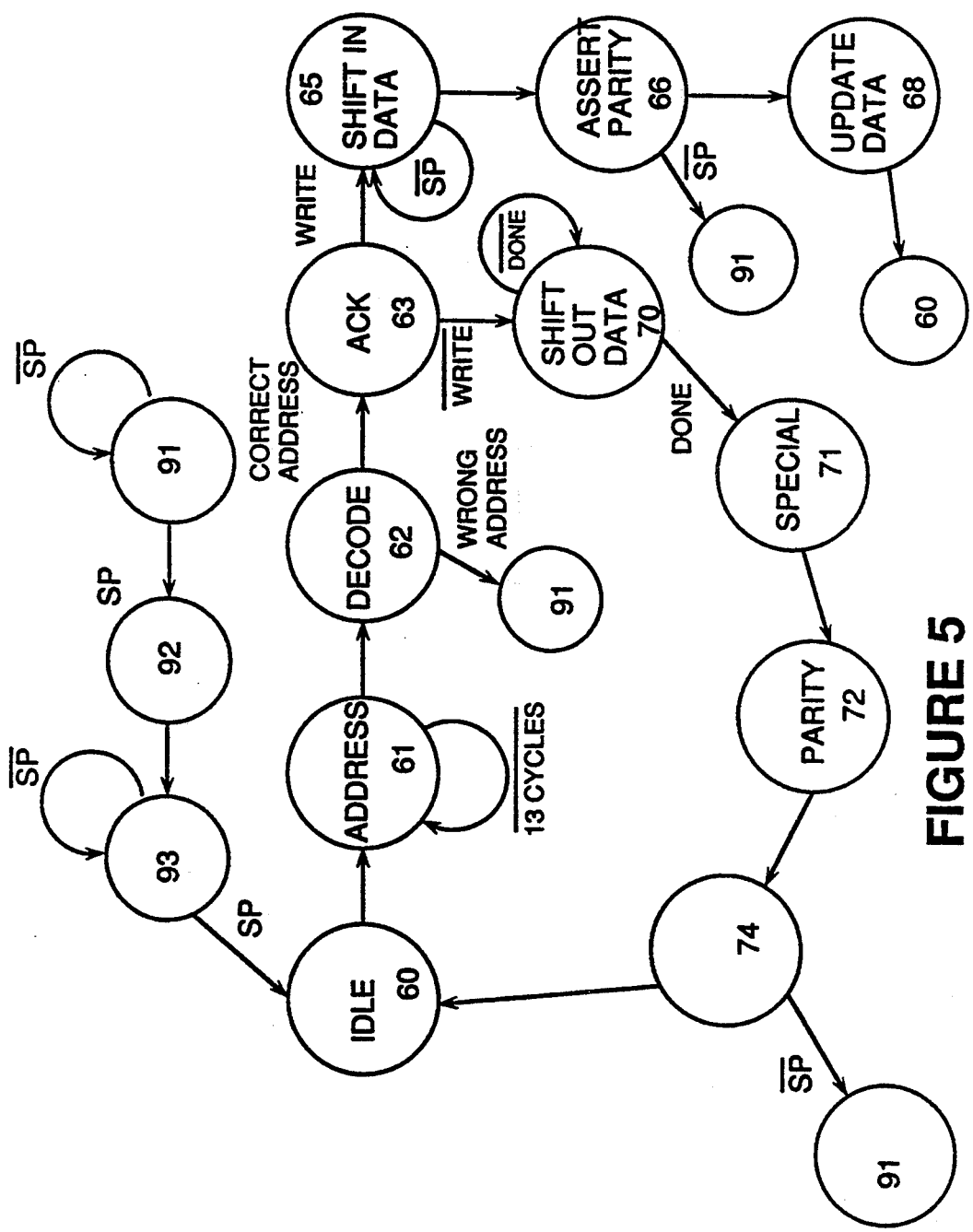
FIG. 5 is a state transition diagram for a state machine used in a bus slave circuit used in the present invention.

FIG. 5 illustrates the states of operation of the bus slave circuit state machine 26. Such a state machine 26 is a part of each of the bus master circuit 13 and bus slave circuits 14 and 16. The state machine 26 is typically in the IDLE state 60 awaiting the receipt of a SPECIAL signal. When a SPECIAL signal is received indicating the beginning of an operation, the state machine 26 transitions to a state 61 in which it spends thirteen clock periods receiving the address provided by a bus master circuit on the data bus 10. After these thirteen periods, the state machine 26 transitions to state 62 to decode the address. If the address is not that of the particular bus slave circuit, the operation moves to a state 91 where it waits for the current operation to complete in the three states 91, 92, and 93. In the three states 91, 92, and 93, the state machine senses the special, parity, special sequence on the bus and then returns the operation to the IDLE condition at state 60.

If the address decoded at state 62 is that of the particular bus slave circuit, the state machine 26 transitions to acknowledge the signal at state 63. If the signal is a write signal, the state machine 26 transitions to state 65 to shift in data until the receipt of a SPECIAL signal from the bus master circuit. The state machine 26 transitions from state 65 on receipt of a SPECIAL signal to state 66 to transfer the parity signal counted during its operation. In state 66, the operation awaits the receipt of the SPECIAL signal indicating a correct parity check and the end of the operation. On receipt of the SPECIAL signal, the state machine 26 transitions to a state 68 to update the register addressed and then recycles to the IDLE state 60. If the SPECIAL signal is not received, the operation returns to the state 91 where it may await the SPECIAL/parity/SPECIAL sequence which allows a retry operation.

If the signal is a read signal, the state machine 26 transitions from the acknowledge state 63 to state 70 to shift out data. When the transfer of the data out has been completed, the bus slave state machine 26 moves to state 71 to assert a SPECIAL signal on the data bus 10. The state machine 26 then transitions from state 71 to state 72 to send a parity signal indicating the number counted during its operation. The operation then moves to state 74 to await the receipt of the SPECIAL signal from the bus master indicating a correct parity check and the end of the operation. On receipt of the SPECIAL signal, the state machine 26 transitions to the IDLE state 60. If the SPECIAL signal is not received, the operation returns to the state 91 where it will await the SPECIAL/parity/SPECIAL signal indicating the end of the transaction.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for rapidly transferring serial data in a two conductor busing arrangement in which one conductor is utilized to transfer data and the other conductor is utilized to transfer clock signals, and in which a plurality of components are connected to the two conductors, wherein said components include a first master circuit, a second master circuit, a first slave circuit, a second slave circuit, and a single clock signal generator, comprising the steps of providing continuously periodic clock signals, from said clock signal generator, on the clock conductor, wherein each one of the clock signals has an active rising edge and an active falling edge, placing a first special signal, from at least one of said master circuits, on the data conductor to indicate the start of an operation, attempting to place a first set of address data, from said first master circuit, on the data conductor, wherein said first set of address data specifies an address of said first slave circuit, attempting to place a second set of address data, from said second master circuit, on the data conductor, wherein said second set of address data specifies an address of said second slave circuit, comparing, in each of said first and second master circuits, said first set of address data with said second set of address data, and granting the first master circuit access to the data conductor if a predetermined relationship between said first set of address data and said second set of address data is satisfied, placing data, from said first master circuit, on the data conductor to indicate a transfer requiring one of said first master circuit and said first slave circuit to act as a transmitting circuit, and the other one of said first master circuit and said first slave circuit to act as a receiving circuit, placing an acknowledge signal, from said first slave circuit, on the data conductor after said first slave circuit verifies that said transmitted first set of address data matches the address of said first slave circuit, performing said transfer by said transmitting circuit sending data to said receiving circuit, placing a second special signal, from said transmitting circuit, on the data conductor to indicate the end of the transfer, and placing a third special signal, from said first master circuit, on the data conductor to indicate the end of the operation.

2. A method for rapidly transferring serial data in a two conductor busing arrangement as claimed in claim 1 further comprising the steps of transferring, from said first slave circuit to said first master circuit, a signal indicating a parity count on the data conductor, comparing the parity count with a parity count retained by said first master circuit, and aborting said operation when the parity count transferred from said first slave circuit differs from said parity count retained by said first master circuit.

3. A method for rapidly transferring serial data in a two conductor busing arrangement as claimed in claim 2 wherein said address data are transferred most significant bit first, and wherein the first set of address data represents a lower numbered address than the address represented by the second set of address data.

4. A two conductor serial bus interface coupled to a single clock signal generator, wherein said two conductor serial bus interface provides a plurality of components with a means for communication and comprises a bus having a first conductor coupled to said components for transferring continuously periodic clock signals, wherein said clock signal generator produces said clock signals and supplies said clock signals to said first conductor, and wherein each one of said clock signals has an active rising edge and an active falling edge, and a second conductor coupled to said components for transferring data, addressing means coupled to said bus for initially attempting to place address bits on the second conductor most significant bit first, wherein said address bits specify the address of one of said components, comparison means coupled to said bus for comparing each address bit with the voltage level on the second conductor as said addressing means attempts to place each one of said address bits on the second conductor, terminating means coupled to said bus for aborting said addressing means' initial attempt to place said address bits on said second conductor when said addressing means attempts to place an address bit having a high voltage value on said bus and the voltage level on said second conductor is low, and announcing means coupled to said bus for indicating that said addressing means has successfully placed all said address bits on said second conductor.

5. A two conductor serial bus interface as claimed in claim 4 which further comprises means coupled to said bus for enabling said addressing means to re-try to place address bits on said second conductor after the terminating means aborts said initial attempt to place address bits on said second conductor.

6. A two conductor serial bus interface as claimed in claim 5 wherein said announcing means produces a completion signal, and wherein said bus interface further comprises means coupled to said bus for detecting the completion signal.

7. A two conductor serial bus interface as claimed in claim 4 in which the address of each component is programmable by software.

* * * * *